(12) United States Patent
Stong et al.

(10) Patent No.: US 10,068,455 B1
(45) Date of Patent: Sep. 4, 2018

(54) MACHINE PRESS DATA MONITORING AND ANALYSIS SYSTEM

(71) Applicant: Steven Label Corporation, Santa Fe Springs, CA (US)

(72) Inventors: Ryan Stong, Huntington Beach, CA (US); Steve Stong, Huntington Beach, CA (US)

(73) Assignee: Steven Label Corporation, Santa Fe Springs, CA (US)

( * ) Notice: Subject to any disclaimer, the term of this patent is extended or adjusted under 35 U.S.C. 154(b) by 0 days.

(21) Appl. No.: 15/487,293

(22) Filed: Apr. 13, 2017

(51) Int. Cl.
*G08B 21/18* (2006.01)
*G08B 29/04* (2006.01)
(Continued)

(52) U.S. Cl.
CPC ........... *G08B 21/182* (2013.01); *G07C 3/005* (2013.01); *G08B 5/22* (2013.01); *G08B 29/04* (2013.01); *H04L 67/12* (2013.01)

(58) Field of Classification Search
CPC ...... G07C 3/005; G08B 21/182; G08B 21/18; G08B 5/22; G08B 5/24; G08B 5/26; G08B 5/28; G08B 5/30; G08B 5/32; G08B 5/34; G08B 5/02; G08B 29/04; G08B 29/00; G08B 29/12; G08B 29/123; G08B 29/02; G08B 29/10; G08B 29/14; H04L 67/12; H04L 67/14; H04L 67/142; H04L 67/143; H04L 67/22; H04L 67/26; H04L 67/18; G01P 1/026; G01P 1/02; G01P 1/04; G01P 1/06; G01P 3/44; G01P 3/42; G01P 3/487; G01P 3/49; G01P 3/495; G01P 3/4953; G01P 3/64; G01P 3/66; G01P 13/00;
(Continued)

(56) References Cited

U.S. PATENT DOCUMENTS 4,737,181 A * 4/1988 Lopez-Zermeno ..... C03B 11/16
65/163
6,070,521 A * 6/2000 Otoshi ...................... B30B 1/42
100/280

(Continued)

FOREIGN PATENT DOCUMENTS

| CN | 204964932 U | 1/2016 |
|---|---|---|
| JP | 59094600 A | 5/1984 |
| JP | 5783887 B2 | 9/2015 |

*Primary Examiner* — Nay Tun
(74) *Attorney, Agent, or Firm* — Knobbe Martens Olson & Bear LLP

(57) ABSTRACT

A network-enabled machine press data monitoring and analysis system is provided herein. The system can include a sensor, a base station, and a server. The sensor may be designed such that the sensor can be placed on any type of machine press to track machine press operation. The sensor is coupled to a machine press and detects machine press cycles. The base station is coupled to the sensor and receives signals from the sensor indicating the detection of machine press cycles. The base station tracks machine press cycles and forwards such information to the server along with time values indicating when the machine press has started and stopped operating. The server can process information received from the base station and generate user interface data that, when rendered by a user device, causes the user device to display the processed information in a graphical user interface.

20 Claims, 12 Drawing Sheets

(51) Int. Cl.
*G08B 5/22* (2006.01)
*G07C 3/00* (2006.01)
*H04L 29/08* (2006.01)

(58) Field of Classification Search
CPC ........ G01P 13/04; G01L 5/0076; G01L 5/008;
G01L 5/0085; G01L 5/0061; G01L 1/00;
G01L 1/02; G01L 1/08; G01L 26/00;
G01L 26/001; G01L 26/002; G01L
26/003; G01L 26/008; B21D 55/00;
B21D 47/00; B30B 11/005; B30B 11/006;
B30B 13/00; B30B 15/00; B30B 15/0094;
B30B 15/14; B30B 15/148; B30B 15/26
See application file for complete search history.

(56) References Cited

U.S. PATENT DOCUMENTS

| | | | | |
|---|---|---|---|---|
| 6,615,103 B2* | 9/2003 | Fujishima | ............. | B23Q 41/08 318/566 |
| 6,688,216 B2* | 2/2004 | Olding | ................. | B30B 15/041 100/258 R |
| 6,947,800 B2* | 9/2005 | Flanagan | ................ | B21C 51/00 700/108 |
| 7,953,559 B2* | 5/2011 | Sundermeyer | .......... | G01N 3/32 702/183 |
| 8,211,359 B2 | 7/2012 | Beane | | |
| 8,294,403 B2* | 10/2012 | Haas | .................... | G05B 19/406 318/473 |
| 8,726,802 B2* | 5/2014 | Senda | .................... | B23Q 15/18 100/48 |
| 9,275,319 B2* | 3/2016 | Sugimoto | .......... | G06K 15/4055 |
| 9,434,118 B2* | 9/2016 | Beane | .................. | B30B 11/005 |
| 2004/0195715 A1* | 10/2004 | Grobl | ................... | B30B 11/005 264/40.5 |
| 2013/0226317 A1* | 8/2013 | Vijayaraghavan | ..... | G06Q 10/04 700/28 |
| 2016/0370399 A1* | 12/2016 | Summers | ................ | B63B 49/00 |
| 2017/0105086 A1* | 4/2017 | Wesby | .................. | H04W 4/001 |

\* cited by examiner

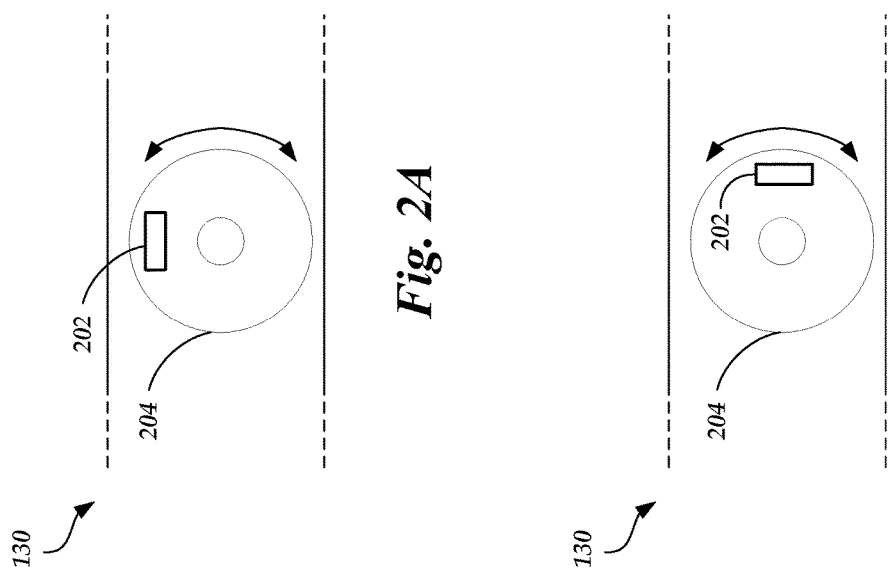

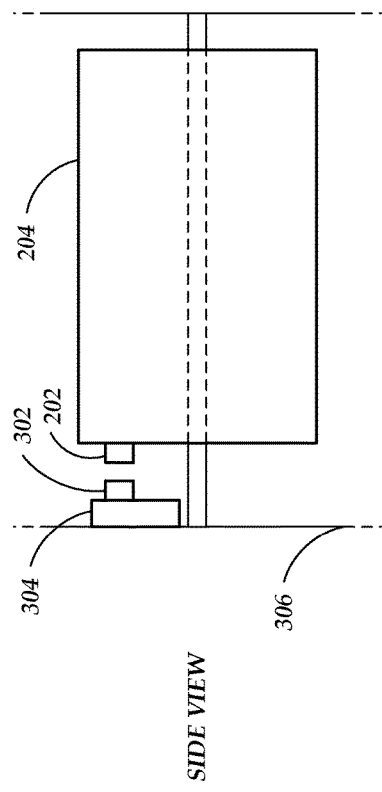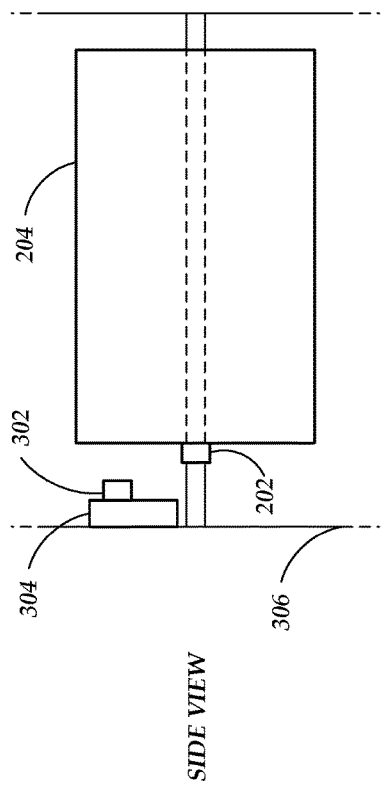

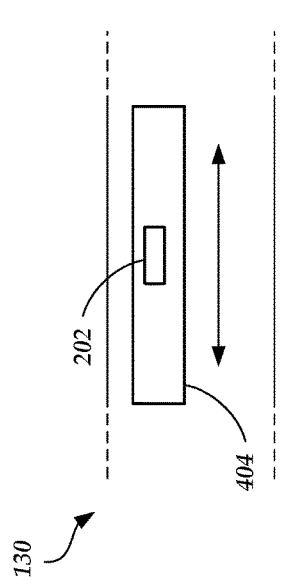
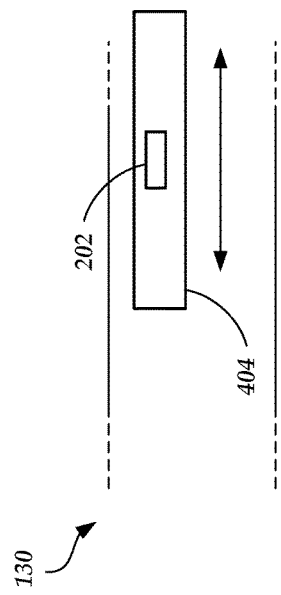
Fig. 4A
Fig. 4B

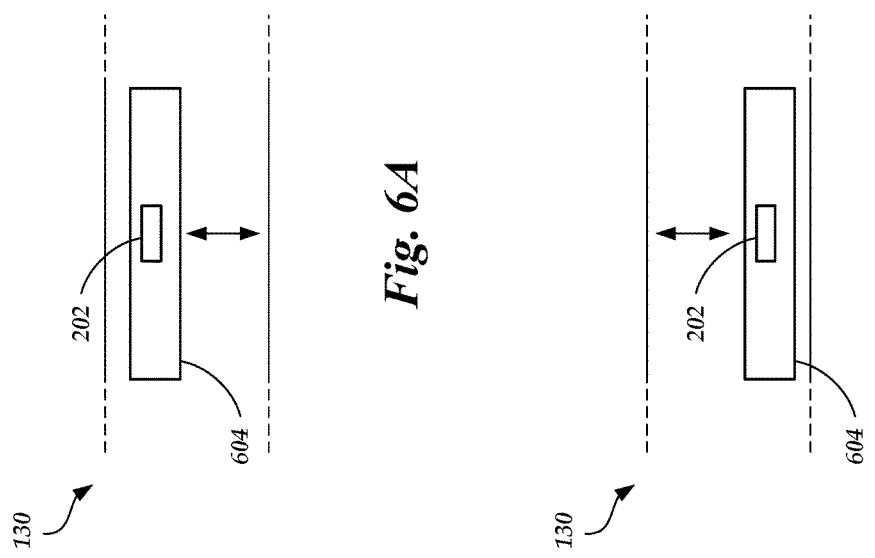

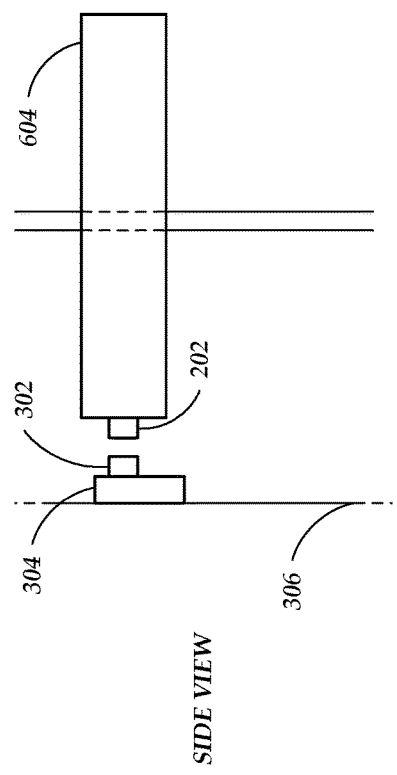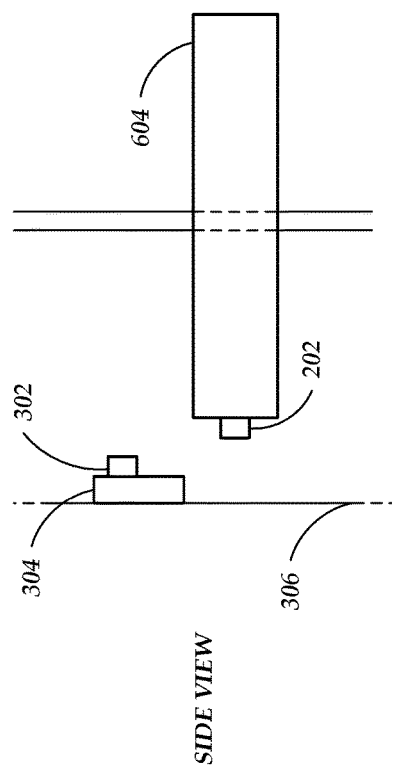

US 10,068,455 B1

MACHINE PRESS DATA MONITORING AND ANALYSIS SYSTEM

BACKGROUND

Machine presses are often used to mass produce various items. For example, a machine press can be used to print a large quantity of labels. While machine presses may be automated, an operator may oversee operation of a press to ensure that the press is working properly. An operator may pause operation of the press if, for example, a jam occurs, the working material (e.g., labels) need to be refilled, the operator takes a break, or other like issues.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system comprising a cycle sensor configured to be coupled to a machine press, where the cycle sensor is configured to detect a cycle of the machine press. The system further comprises a base station configured to communicate with the cycle sensor, where the base station is further configured with computer-executable instructions that, when executed, cause the base station to at least: process a first signal received from the cycle sensor; transmit a start message to a server over a network in response to reception of the first signal, where the start message indicates that the machine press has started running; process a second signal received from the cycle sensor after the first signal; determine that no signal has been received from the cycle sensor during a threshold period of time after reception of the second signal; and transmit an end message to the server over the network in response to the determination that no signal has been received from the cycle sensor during the threshold period of time after the reception of the second signal, where the end message indicates that the machine press has stopped running.

The system of the preceding paragraph can include any sub-combination of the following features: where the cycle sensor comprises a circuit configured to be coupled to a fixed surface of the machine press, a first magnet configured to be coupled to the circuit, and a second magnet configured to be coupled to a component of the machine press that moves in a repetitive pattern; where a movement of the second magnet passed the first magnet causes the circuit to generate the first signal and transmit the first signal to the base station; where generation of the first signal represents a detection of one cycle of the machine press; where the component of the machine press comprises at least one of a component that rotates about an axis, a component that moves back and forth in a horizontal direction, or a component that moves back and forth in a vertical direction; where the first magnet and the second magnet are configured to be positioned within the machine press such that the second magnet passes the first magnet in a same horizontal or vertical plane during completion of one cycle of the machine press; where the start message comprises a time value corresponding to a time that the first signal is received by the base station; where the end message comprises a time value corresponding to a time that the second signal is received by the base station and a number of detected cycles; where the number of detected cycles is based on a number of signals received by the base station from the cycle sensor; where the server is configured to determine an amount of material processed by the machine press based on the number of detected cycles and a conversion factor associated with the machine press; where the base station comprises a terminal block with a plurality of output ports, and where the system further comprises an external device coupled to the plurality of output ports; where the base station is further configured with computer-executable instructions that, when executed, cause the base station to at least: output a first voltage on a first output port in the plurality of output ports and on a second output port in the plurality of output ports after the first signal is received and before the second signal is received to cause the external device to output a first color, and output the first voltage on the first output port and a second voltage on the second output port after the threshold period of time after reception of the second signal has elapsed to cause the external device to output a second color different from the first color.

Another aspect of the disclosure provides a computer-implemented method comprising, as implemented by one or more computing devices configured with specific computer-executable instructions: receiving a first signal from a cycle sensor, where the cycle sensor is coupled to a machine press and is configured to detect a cycle of the machine press; transmitting a start message to a server over a network in response to reception of the first signal, where the start message indicates that the machine press has started running; receiving a second signal from the cycle sensor after the first signal; determining that no signal has been received from the cycle sensor during a threshold period of time after reception of the second signal; and transmitting an end message to the server over the network in response to the determination that no signal has been received from the cycle sensor during the threshold period of time after the reception of the second signal, where the end message indicates that the machine press has stopped running.

The computer-implemented method of the preceding paragraph can include any sub-combination of the following features: where the cycle sensor comprises a circuit coupled to a fixed surface of the machine press, a first magnet coupled to the circuit, and a second magnet coupled to a component of the machine press that moves in a repetitive pattern; where a movement of the second magnet passed the first magnet causes the circuit to generate and transmit the first signal; where the first magnet and the second magnet are positioned within the machine press such that the second magnet passes the first magnet in a same horizontal or vertical plane during completion of one cycle of the machine press; where the one or more computing devices comprises a terminal block with a plurality of output ports, and where an external device is coupled to the plurality of output ports; and where the computer-implemented method further comprises outputting a first voltage on a first output port in the plurality of output ports and on a second output port in the plurality of output ports after the first signal is received and before the second signal is received to cause the external device to output a first color, and outputting the first voltage on the first output port and a second voltage on the second output port after the threshold period of time after reception of the second signal has elapsed to cause the external device to output a second color different from the first color.

Another aspect of the disclosure provides a non-transitory, computer-readable storage media comprising computer-executable instructions stored thereon that, when executed by a computer system, cause the computer system to: process a first signal received from a cycle sensor, where the cycle sensor is coupled to a machine press and is configured to detect a cycle of the machine press; transmit a start message to a server over a network in response to reception of the first signal, where the start message indicates that the machine press has started running; process a second signal received from the cycle sensor after the first signal; determine that no signal has been received from the cycle sensor during a threshold period of time after reception of the second signal; and transmit an end message to the server over the network in response to the determination that no signal has been received from the cycle sensor during the threshold period of time after the reception of the second signal, where the end message indicates that the machine press has stopped running.

The non-transitory, computer-readable storage media of the preceding paragraph can include any sub-combination of the following features: where the cycle sensor comprises a circuit coupled to a fixed surface of the machine press, a first magnet coupled to the circuit, and a second magnet coupled to a component of the machine press that moves in a repetitive pattern.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 2A-2B illustrate an example component of the machine press that rotates about an axis during machine press operation.

FIGS. 3A-3B illustrate a side view of an example cycle sensor for use with a machine press that includes a component, such as the component of FIGS. 2A-2B, that rotates about an axis during machine press operation.

FIGS. 4A-4B illustrate an example component of the machine press that moves back and forth in a horizontal direction during machine press operation.

FIGS. 6A-6B illustrate an example component of the machine press that moves back and forth in a vertical direction during machine press operation.

FIGS. 7A-7B illustrate a side view of an example cycle sensor for use with a machine press that includes a component, such as the component of FIGS. 6A-6B, that moves back and forth in a vertical direction during machine press operation.

DETAILED DESCRIPTION OF SPECIFIC EMBODIMENTS

Figure 1:
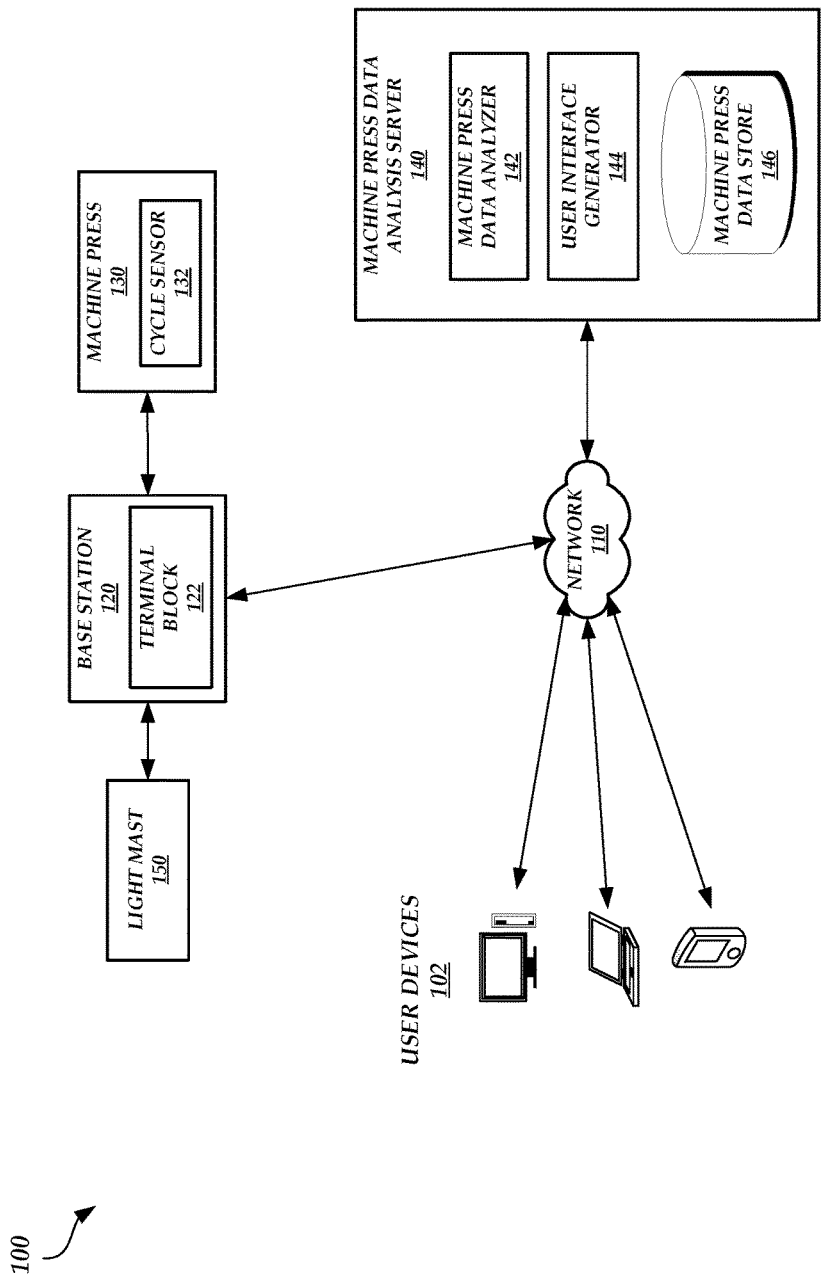
FIG. 1 is a block diagram of an illustrative machine press data monitoring and analysis environment in which data from a machine press is aggregated and analyzed.

As described above, an operator may pause operation of a machine press if, for example, a jam occurs, the working material (e.g., labels) need to be refilled, the operator takes a break, or other like issues occur. To ensure efficient use of machine presses, it may be desirable to track machine press performance. Some systems exist that track machine press performance. However, such systems are often large in size, expensive to implement, and are designed for use with a particular type of machine press.

Accordingly, an inexpensive, network-enabled machine press data monitoring and analysis system is described herein. For example, the system can include a sensor, a base station, and a server. The sensor may be designed such that the sensor can be placed on any type of machine press to track machine press operation. In addition, the sensor and base station may have a relatively small form factor such that the system can be inexpensive to develop and install.

As described herein, the sensor in a preferred embodiment detects machine press cycles using two magnets. For example, the machine press may include a roll or cylinder that rotates about a fixed axis during press operation. As another example, the machine press may include a component that moves back and forth in a horizontal direction. As another example, the machine press may include a component that moves back and forth in a vertical direction. A first magnet may be placed on the component that exhibits repetitive motion. A second magnet may be placed on a stationary portion of the machine press adjacent to the moving component such that the first magnet periodically passes the second magnet during press operation. The first magnet passing the second magnet may be considered one cycle. Thus, each time the first magnet passes the second magnet, a circuit coupled to the second magnet may transmit a signal to the base station indicating that a cycle was detected. This sensor design is advantageous because it allows the system to track press cycles regardless of the size or type of the press.

The first time the base station receives a signal from the sensor in one embodiment, the base station transmits a start message to the server via a wired or wireless connection indicating that the machine press has started running. The start message includes a start time. During press operation, the base station tracks the number of times a signal is received from the sensor indicating that a cycle is completed. If a signal has not been received from the sensor for a threshold period of time (e.g., 5 seconds, 10 seconds, etc.), then the base station determines that the machine press has stopped running. Once the base station determines that the machine press has stopped running, the base station transmits an end message to the server via a wired or wireless connection indicating that the machine press has stopped running. The end message includes an end time and the number of detected cycles.

The end message may further include additional information, such as an operator name, a job identification, and any comments or notes. For example, the base station can be coupled to a scanner, such as a bar code reader, a QR code reader, and/or the like. An operator can use the scanner to scan one or more codes that are associated with predefined information. For example, a specific code may be associated with the name of the operator, a job identification, an event that occurred (e.g., jam, part malfunction, working material refilled, operator break, etc.), or any other comments or notes. Any codes scanned by the operator after the start message is transmitted to the server and before the end message is transmitted to the server can be included in the end message. As another example, an input device (e.g., mouse, keyboard, touchscreen, physical button, etc.) can be coupled to the base station. Any input entered after the start message is transmitted and before the end message is transmitted can be included in the end message.

The base station may also send periodic messages between the start message and the end message. For example, the server may store a conversion factor to convert cycles into distance (e.g., feet, meters, etc.). The server can transmit the conversion factor to the base station and the base station can use the conversion factor to calculate press speed. The base station may calculate press speed by determining the number of cycles that have been detected (e.g., since the start message was transmitted, since the last time the press speed was calculated, etc.), converting the number of cycles into distance using the conversion factor, and dividing the distance by time (e.g., the time since the start message was transmitted, the time since the last time the press speed was calculated, etc.). The base station can display the calculated speed in a user interface. The base station can also transmit a message to the server indicating the speed each time the speed is calculated. The base station can calculate the speed at any time interval (e.g., every 1 second, 10 seconds, 1 minute, etc.).

The base station may also include a terminal block that can be used to control external devices. For example, the base station may include a plurality of output ports (e.g., 2, 3, 4, etc.) that can each produce a high voltage (e.g., a logical "1") or a low voltage (e.g., a logical "0"). One or more external devices can be coupled to the output ports and be used to indicate a status of the machine press or provide similar information. In one example, a light mast can be coupled to one or more of the output ports. The mast may produce a light based on whether the machine press is running or is stopped (e.g., a green light if the machine press is running and a red light if the machine press is stopped).

The server can generate user interface data derived from the base station messages that, when rendered by a user device, causes the user device to display the derived data in a graphical user interface (GUI). For example, the server can convert the number of cycles included in the end message into a distance value using the conversion factor. For each pair of start and end messages, the server can update a table in the GUI with the start time, the end time, the distance value, and any other information included in the end message. The server can receive such data from multiple press machines such that the user can compare machines, operators, etc. The GUI may also include a dashboard showing the status of and other information related to multiple press machines. A user can also instruct the server to perform an analysis of the data, such as average press speed, press down time during a 24 hour period, manned percentage, the most common errors, and/or the like.

While the system is described herein for use with a machine press used to produce labels, this is not meant to be limiting. The system can be installed for use with any type of machine press.

In addition, while the sensor is described herein as including two magnets, this is not meant to be limiting. For example, the sensor may include a radio frequency identification (RFID) tag (e.g., located on the movable component of the machine press) and an RFID tag reader (e.g., located on a fixed portion of the machine press). The RFID tag reader can detect when the RFID tag passes the RFID tag reader. The RFID tag reader can transmit a signal to the base station that indicates that a cycle was detected when the RFID tag passes the RFID tag reader. As another example, the sensor may include a motion sensor that is located on a portion of the machine press (e.g., a fixed portion of the machine press) such that the motion sensor can detect motion of the component. The motion sensor can transmit a signal to the base station that indicates that a cycle was detected when the motion sensor detects motion. As another example, the sensor may include a video camera located on a portion of the machine press (e.g., a fixed portion of the machine press) such that the presence and/or movement of a component can be captured. The video camera can be coupled to a computing device that can analyze data captured by the video camera, identify that the presence or movement of a component was detected, and transmit to the base station an indication a cycle was detected (e.g., that the presence or movement of the component was detected). Thus, the sensor may include any components or circuitry that can be used to detect the presence or movement of a component of the machine press.

Example Machine Press Data Monitoring and Analysis Environment

FIG. 1 is a block diagram of an illustrative machine press data monitoring and analysis environment 100 in which data from a machine press 130 is aggregated and analyzed. As illustrated in FIG. 1, the machine press data monitoring and analysis environment 100 includes user devices 102, a base station 120, the machine press 130, a machine press data analysis server 140, and a light mast 150.

While FIG. 1 illustrates a single base station 120, a single machine press 130, and a single light mast 150, this is not meant to be limiting. The machine press data monitoring and analysis environment 100 may include any number of base stations 120, machine presses 130, and light masts 150, where each base station 120 communicates with the machine press data analysis server 140. For example, a single base station 120 may be coupled to a single machine press 130 and a single light mast 150. Alternatively, one or more base stations 120 may be coupled to a single machine press 130 and/or a single light mast 150 or a single base station 120 may be coupled to multiple machine presses 130 and/or multiple light masts 150.

The base station 120 may be coupled via a wired and/or wireless connection to the machine press 130 and the light mast 150. The user devices 102, the base station 120, and/or the machine press data analysis server 140 may communicate via one or more communication networks 110. The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a semi-private network, such as a corporate or university intranet, or a private network. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The machine press 130 can be any machine, component of a machine, or machine tool that changes the shape of an item via the application of pressure. For example, the machine press 130 can change the shape of a flat adhesive or label by indenting the label to form text (e.g., modifying the label to include readable text). The machine press 130 may include a cycle sensor 132 that is configured to measure one or more cycles of the machine press 130. A machine press 130 cycle can represent a specific action depending on the configuration of the machine press 130. For example, the machine press 130 may include a roll or cylinder that rotates about a fixed axis during machine press 130 operation. One cycle may then be represented as a full 360 degree rotation of the roll or cylinder. As another example, the machine press 130 may include a component that moves back and forth in a horizontal direction. One cycle may then be represented as the component starting at an initial horizontal position, moving to a second horizontal position, and then returning to the original initial horizontal position. As another example, the machine press 130 may include a component that moves back and forth in a vertical direction. One cycle may then be represented as the component starting at an initial vertical position, moving to a second vertical position, and then returning to the original initial vertical position. As another example, the machine press 130 may include a component that moves back and forth in both a horizontal and vertical direction. One cycle may then be represented as the component starting at an initial position, moving to a second position via a horizontal and/or vertical movement, and then returning to the original initial position.

In an embodiment, the cycle sensor 132 detects machine press 130 cycles using two magnets. A first magnet may be placed on the component that exhibits repetitive motion (e.g., the roll, cylinder, component that moves in a horizontal direction, component that moves in a vertical direction, component that moves in both a horizontal and vertical direction, etc.). A second magnet may be placed on a stationary portion of the machine press 130 adjacent to the moving component such that the first magnet periodically passes the second magnet during machine press 130 operation. The first magnet passing the second magnet may be considered one cycle. Thus, each time the first magnet passes the second magnet, a circuit of the cycle sensor 132 that is coupled to the second magnet may transmit a signal to the base station 120 indicating that a cycle was detected via a wired or wireless connection. This cycle sensor 132 design is advantageous because the design allows the base station 120 and/or machine press data analysis server 140 to track machine press 130 cycles regardless of the size or type of the machine press 130.

The base station 120 may be any computing device (or a plurality of computing devices) that comprises one or more processors, memory, and other physical hardware (e.g., a display, an input device like a mouse, keyboard, or button, etc.). Memory of the base station 120 may store computer-executable instructions that, when executed by the one or more processors of the base station 120, cause the base station 120 to perform the functionality described herein. In particular, the base station 120 can be configured to track machine press 130 cycles detected by the cycle sensor 132 and provide data corresponding to the tracked cycles to the machine press data analysis server 140 via the network 110. For example, the first time the base station 120 receives a signal from the cycle sensor 132, the base station 120 generates a start message indicating that the machine press 130 has started running and transmits the start message to the machine press data analysis server 140. The start message may include a start time (e.g., a timestamp value representing a start time). During machine press 130 operation, the base station 120 can track the number of times a signal is received from the cycle sensor 132 indicating that a cycle is completed. If a signal has not been received from the cycle sensor 132 for a threshold period of time (e.g., 5 seconds, 10 seconds, etc.), then the base station 120 can make a determination that the machine press 130 has stopped running. Once the base station 120 determines that the machine press 130 has stopped running, the base station 120 generates an end message indicating that the machine press 130 has stopped running and transmits the end message to the machine press data analysis server 140. The end message may include an end time (e.g., a timestamp value representing an end time) and/or the number of detected cycles.

The end message may further include additional information, such as an operator name, a job identification, and any comments or notes. For example, the base station 120 can be coupled to a scanner, such as a bar code reader, a QR code reader, and/or the like. An operator can use the scanner to scan one or more codes that are associated with predefined information. For example, a specific code may be associated with the name of the operator, a job identification, an event that occurred (e.g., jam, part malfunction, working material refilled, etc.), or any other comments or notes. Any codes scanned by the operator after the start message is transmitted by the base station 120 to the machine press data analysis server 140 and before the end message is transmitted by the base station 120 to the machine press data analysis server 140 can be included in the end message. As another example, an input device (e.g., a mouse, keyboard, touchscreen, physical button, etc.) can be coupled to the base station 120. Any input entered or selected after transmission of the start message and before transmission of the end message can be included in the end message.

In further embodiments, the base station 120 sends periodic messages between the start message and the end message. For example, the machine press data analysis server 140 (e.g., machine press data store 146 described below) may store a conversion factor to convert cycles into distance (e.g., feet, meters, etc.). The distance may represent, for example, the length or amount of material (e.g., labels) processed by the machine press 130 during operation. The machine press data analysis server 140 can transmit the conversion factor to the base station 120. The base station 120 can then use the conversion factor to calculate machine press 130 speed (e.g., in miles per hour (MPH), kilometers per hour (KPH), revolutions per minute (RPM), etc.). For example, the base station 120 may calculate machine press 130 speed by (1) determining the number of cycles that have been detected (e.g., since the start message was transmitted, since the last time the machine press 130 speed was calculated, etc.), (2) converting the determined number of cycles into a distance value by multiplying the determined number of cycles by the conversion factor, and (3) dividing the distance value by time (e.g., the time since the start message was transmitted, the time since the last time the machine press 130 speed was calculated, etc.). In some embodiments, the base station 120 includes a display and the base station 120 can therefore display the calculated speed in a user interface presented on the display. The base station 120 can also transmit a message to the machine press data analysis server 140 that indicates the calculated machine press 130 speed each time the speed is calculated and/or in periodic intervals. The base station 120 can calculate the speed at any time interval (e.g., every 1 second, 10 seconds, 1 minute, etc.).

The machine press data analysis server 140 can be a computing system configured to aggregate data provided in the start messages and end messages associated with one or more machine presses 130, analyze the aggregated data, and generate user interfaces for displaying the analysis. For example, the machine press data analysis server 140 may be a single computing device, or it may include multiple distinct computing devices, such as computer servers, logically or physically grouped together to collectively operate as a server system. The components of the machine press data analysis server 140 can each be implemented in application-specific hardware (e.g., a server computing device with one or more ASICs) such that no software is necessary, or as a combination of hardware and software. In addition, the modules and components of the machine press data analysis server 140 can be combined on one server computing device or separated individually or into groups on several server computing devices. The machine press data analysis server 140 can be located local to the base station 120 and/or machine press 130 (e.g., in the same building as the base station 120 and/or machine press 130) or remote from the base station 120 and/or machine press 130 (e.g., located in a geographic location that is different than the location of the base station 120 and/or machine press 130). In some embodiments, the machine press data analysis server 140 may include additional or fewer components than illustrated in FIG. 1.

In some embodiments, the features and services provided by the machine press data analysis server 140 may be implemented as web services consumable via the communication network 110. In further embodiments, the machine press data analysis server 140 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The machine press data analysis server 140 may include various modules, components, data stores, and/or the like to provide the machine press 130 data aggregation and analysis functionality described herein. For example, the machine press data analysis server 140 may include a machine press data analyzer 142, a user interface generator 144, and a machine press data store 146.

The machine press data analyzer 142 may receive the start and end messages from the base station 120 via the network 110. The machine press data analyzer 142 can convert the number of cycles included in the end message into a distance value using the conversion factor. For example, the machine press data analyzer 142 can retrieve a conversion factor from the machine press data store 146 and compute the distance value by multiplying the number of cycles included in an end message by the conversion factor.

Figure 11:
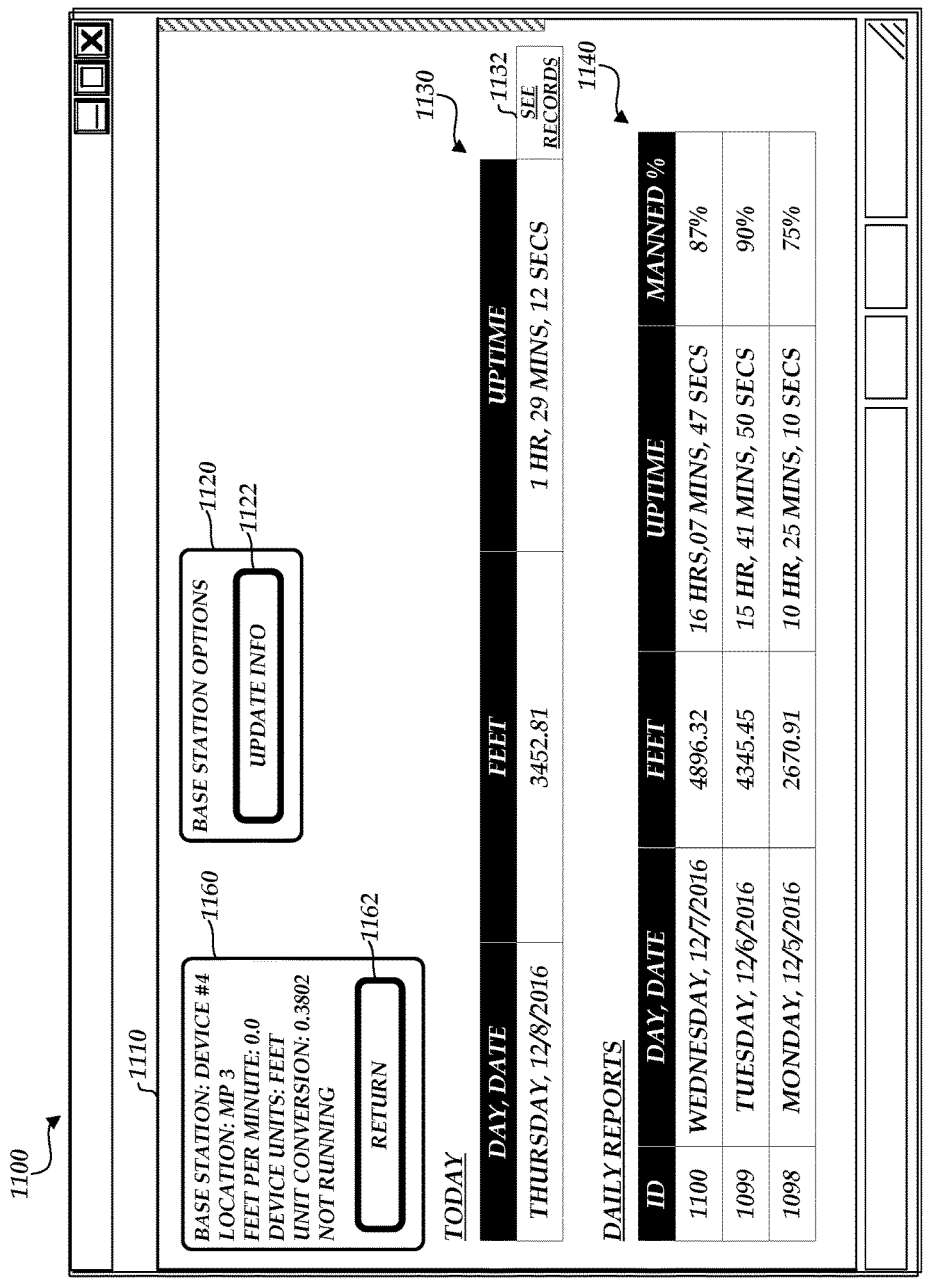
FIG. 11 illustrates an example user interface that may be displayed on a user device if a button in the user interface of FIG. 10 that corresponds with a machine press that is not running is selected.
Figure 12:
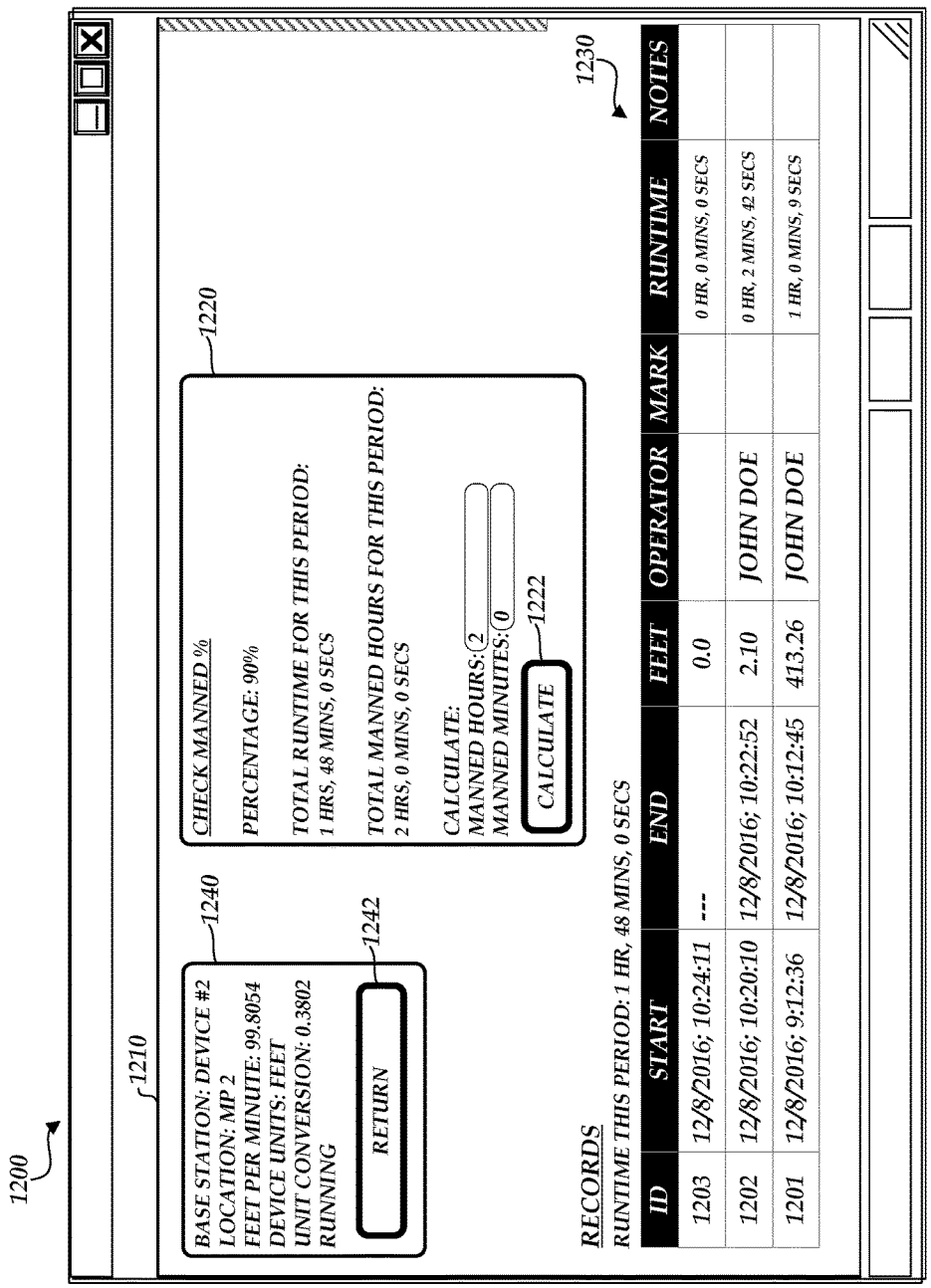
FIG. 12 illustrates an example user interface that may be displayed on a user device if a button in the user interface of FIG. 10 that corresponds with a machine press that is running is selected.

The machine press data analyzer 142 can generate and update tables that are each associated with a particular machine press 130. One or more tables may be associated with a single machine press 130 (e.g., each table may correspond to a different component of the machine press 130 that exhibits repetitive motions forming a cycle, multiple tables may correspond to the same component of the machine press 130 (as shown in FIGS. 11-12), etc.). For example, for each pair of start and end messages associated with a particular machine press 130, the machine press data analyzer 142 can add a row in the table associated with the respective machine press 130 that includes the start time, the end time, the computed distance value, and/or any other information included in the end message (e.g., job identification, operator, etc.). The machine press data analyzer 142 may store a generated or updated table in the machine press data store 146 in an entry associated with the machine press 130 corresponding to the table.

The user interface generator 144 can generate user interface data that, when transmitted to a user device 102 and rendered, causes the user device 102 to display a GUI showing the generated tables. The user interface generator 144 may also generate user interface data that, when transmitted to a user device 102 and rendered, causes the user device 102 to display a GUI that includes a dashboard showing the status of and other information related to one or more press machines 130.

In some embodiments, a user, via a user device 102, can transmit a request to the machine press data analyzer 142 to perform an analysis of the data associated with a particular machine press 130 (or a set of machine presses 130). For example, the analysis can include determining an average machine press 130 speed, machine press 130 down time during a period of time (e.g., a 24 hour period, a 48 hour period, a week, etc.), manned percentage, the most common errors (e.g., as indicated by scanned codes during and/or after machine press 130 operation), and/or the like. The user interface generator 144 can then generate user interface data that causes the user device 102 to display the performed analysis in a GUI.

The machine press data store 146 stores, in an entry associated with a particular machine press 130, one or more generated tables and one or more conversion factors (e.g., each conversion factor may be associated with a different component of the machine press 130 that exhibits repetitive motions forming a cycle). The machine press data store 146 may be located internal to the machine press data analysis server 140. In other embodiments, not shown, the machine press data store 146 is located external to the machine press data analysis server 140, such as on a separate system or server.

In further embodiments, the base station 120 includes a terminal block 122 that can be used to control external devices, such as the light mast 150. For example, the base station 120 may include a plurality of output ports (e.g., 3 output ports, 4 output ports, etc.) that can each produce a high voltage (e.g., a logical "1") or a low voltage (e.g., a logical "0"). One or more external devices can be coupled to the output ports and be used to indicate a status of the machine press 130 or provide similar information. In one example, the light mast 150 can be coupled to one or more of the output ports. Each output port may be set to a high voltage or a low voltage depending on the state of the machine press 130. The different configurations of high and low voltages on the output ports can cause the light mast 150 to produce different light. For example, if all the output ports produce a low voltage, this may cause the light mast 150 to produce a green light (e.g., which can indicate that the machine press 130 is running). As another example, if all the output ports produce a high voltage, this may cause the light mast 150 to produce a red light (e.g., which can indicate that the machine press 130 is stopped). As another example, if one output port has a high voltage and the other output ports have a low voltage, then this may cause the light mast 150 to produce a yellow light (e.g., which can indicate that there is a problem with the machine press 130).

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and/or the like. The user devices 102 may execute an application (e.g., a browser, a media player, etc.) that allows a user to interact with the machine press data analysis server 140 to request analyses and/or to view aggregated and/or analyzed machine press 130 data.

In other embodiments, not shown, the machine press data monitoring and analysis environment 100 does not include the base station 120. Rather, the light mast 150 may be coupled to the machine press 130 and/or the machine press data analysis server 140 and the machine press data analysis server 140 (e.g., the machine press data analyzer 142) can implement the functionality of the base station 120 described herein. The cycle sensor 132 may further include a network interface such that the cycle sensor 132 can then communicate directly with the machine press data analysis server 140 instead of with the base station 120.

Example Cycle Sensors

FIGS. 2A-2B illustrate an example component 204 of the machine press 130 that rotates about an axis during machine press 130 operation. As illustrated in FIGS. 2A-2B, the component 204 includes a magnet 202 coupled thereto. The magnet 202 may be one component in the cycle sensor 132. As the component 204 rotates about the axis, the position of the magnet 202 may change accordingly (e.g., as shown by the position of the magnet 202 in FIG. 2B as compared to the position of the magnet 202 in FIG. 2A).

FIGS. 3A-3B illustrate a side view of an example cycle sensor 132 for use with a machine press 130 that includes a component, such as the component 204, that rotates about an axis during machine press 130 operation. As illustrated in FIGS. 3A-3B, a circuit 304 may be mounted or removably attached to a fixed surface 306 of the machine press 130. The fixed surface 306 may be a surface or component of the machine press 130 that does not move during machine press 130 operation and/or that is capable of moving when the machine press 130 is not operating (e.g., the fixed surface 306 can be a removable panel that can be removed to access other components of the machine press 130 when the machine press 130 is not in use).

The circuit 304 may also be coupled to the base station 120 via a wired and/or wireless connection. A magnet 302 may be coupled to and/or embedded within the circuit 304. The magnet 302 and the circuit 304 may be positioned on the fixed surface 306 such that the magnet 202 passes the magnet 302 in the same horizontal plane as the component 204 rotates about the axis during machine press 130 operation (e.g., as shown in FIG. 3A). As the component 204 rotates, the magnet 202 may move accordingly (e.g., as shown in FIG. 3B). Once the magnet 202 again reaches the magnet 302 (e.g., once the magnet 202 is in the same horizontal plane as the magnet 302 as shown in FIG. 3A), then the component 204 may have completed one cycle.

The magnets 202 and 302 and the circuit 304 may together form the cycle sensor 132. As the magnet 202 passes the magnet 302 in the same horizontal plane (e.g., as shown in FIG. 3A), a current may be generated that causes the circuit 304 to transmit a signal to the base station 120 via the wired and/or wireless connection. As described herein, each signal transmission may represent the detection of a cycle by the cycle sensor 132.

FIGS. 4A-4B illustrate an example component 404 of the machine press 130 that moves back and forth in a horizontal direction during machine press 130 operation. As illustrated in FIGS. 4A-4B, the component 404 includes the magnet 202 coupled thereto. As the component 404 moves back and forth in the horizontal direction, the position of the magnet 202 may change accordingly (e.g., as shown by the position of the magnet 202 in FIG. 4B as compared to the position of the magnet 202 in FIG. 4A).

Figure 5A:
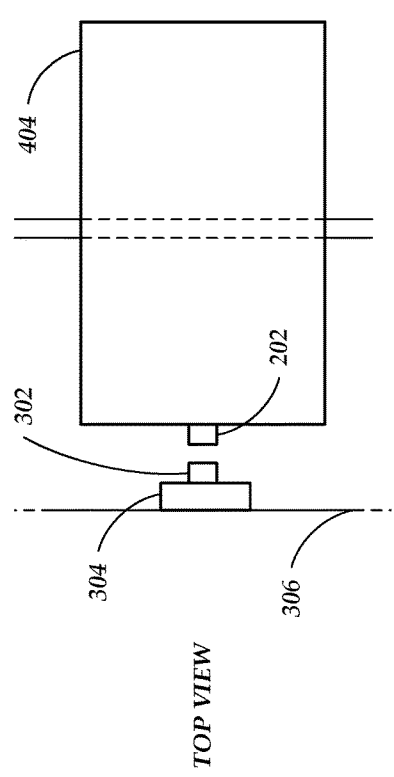
FIGS. 5A-5B illustrate a top view of an example cycle sensor for use with a machine press that includes a component, such as the component of FIGS. 4A-4B, that moves back and forth in a horizontal direction during machine press operation.
Figure 5B:
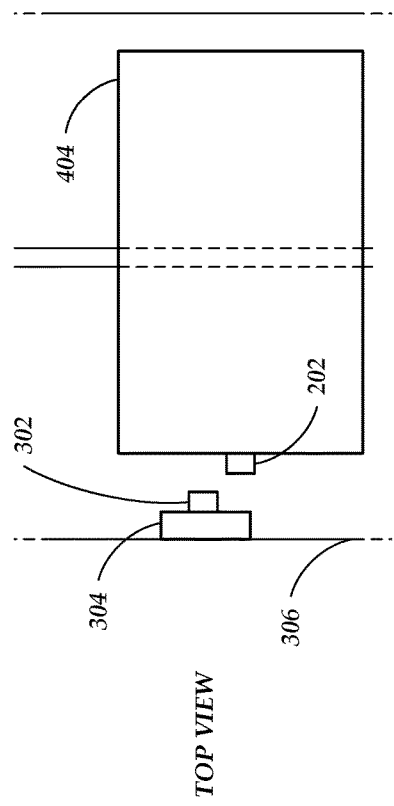

FIGS. 5A-5B illustrate a top view of an example cycle sensor 132 for use with a machine press 130 that includes a component, such as the component 404, that moves back and forth in a horizontal direction during machine press 130 operation. As illustrated in FIGS. 5A-5B, the circuit 304 may be mounted or removably attached to the fixed surface 306 of the machine press 130. The magnet 302 and the circuit 304 may be positioned on the fixed surface 306 such that the magnet 202 passes the magnet 302 in the same vertical plane as the component 404 moves back and forth in a horizontal direction during machine press 130 operation (e.g., as shown in FIG. 5A). As the component 404 moves in the horizontal direction, the magnet 202 may move accordingly (e.g., as shown in FIG. 5B). Once the magnet 202 again reaches the magnet 302 (e.g., once the magnet 202 is in the same vertical plane as the magnet 302 as shown in FIG. 5A), then the component 404 may have completed one cycle. As described herein, as the magnet 202 passes the magnet 302 in the same vertical plane (e.g., as shown in FIG. 5A), a current may be generated that causes the circuit 304 to transmit a signal to the base station 120 via the wired and/or wireless connection.

FIGS. 6A-6B illustrate an example component 604 of the machine press 130 that moves back and forth in a vertical direction during machine press 130 operation. As illustrated in FIGS. 6A-6B, the component 604 includes the magnet 202 coupled thereto. As the component 604 moves back and forth in the vertical direction, the position of the magnet 202 may change accordingly (e.g., as shown by the position of the magnet 202 in FIG. 6B as compared to the position of the magnet 202 in FIG. 6A).

FIGS. 7A-7B illustrate a side view of an example cycle sensor 132 for use with a machine press 130 that includes a component, such as the component 604, that moves back and forth in a vertical direction during machine press 130 operation. As illustrated in FIGS. 7A-7B, the circuit 304 may be mounted or removably attached to the fixed surface 306 of the machine press 130. The magnet 302 and the circuit 304 may be positioned on the fixed surface 306 such that the magnet 202 passes the magnet 302 in the same horizontal plane as the component 604 moves back and forth in a vertical direction during machine press 130 operation (e.g., as shown in FIG. 7A). As the component 604 moves in the vertical direction, the magnet 202 may move accordingly (e.g., as shown in FIG. 7B). Once the magnet 202 again reaches the magnet 302 (e.g., once the magnet 202 is in the same horizontal plane as the magnet 302 as shown in FIG. 7A), then the component 604 may have completed one cycle. As described herein, as the magnet 202 passes the magnet 302 in the same horizontal plane (e.g., as shown in FIG. 7A), a current may be generated that causes the circuit 304 to transmit a signal to the base station 120 via the wired and/or wireless connection.

In other embodiments, not shown, the circuit 304 can be mounted or removably attached to a component or surface of the machine press 130 that moves or is capable of moving during machine press 130 operation. For example, the circuit 304 can be mounted to a surface or component that returns to the same position each time the component 204 completes a cycle such that the magnet 202 passes the magnet 302 at the same position each time the component 204 completes a cycle.

As described herein, an existing machine press 130 can be retrofitted to include the cycle sensor 132. For example, the magnets 202 and 302 (or other cycle detection components, such as RFID tags, RFID tag readers, motion sensors, video cameras, etc.) can be removably or permanently affixed to the respective portion of the machine press 130 described herein using any known coupling substance (e.g., glue, nails, tape, magnets, screws, etc.). The magnets 202 and/or 302 may alternatively be welded to the respective portion of the machine press 130 described herein. Similarly, the base station 120 may be removably or permanently mounted to a portion of the machine press 130 using any known coupling substance.

In other embodiments, a new machine press 130 can be designed and manufactured to include an embedded cycle sensor 132. For example, the magnets 202 and 302 (or other cycle detection components, such as RFID tags, RFID tag readers, motion sensors, video cameras, etc.) can be integrated within or affixed adjacent to a fixed portion and/or movable component of the machine press 130. Given the properties of the magnets 202 and 302, the magnets 202 and/or 302 can be integrated within the walls of the machine press 130 and/or within the enclosure of the movable component of the machine press 130 such that the magnets 202 and/or 302 are not visible. The functionality of the base station 120 described herein can then be integrated within a computing device or other component that controls the operation of the machine press 130. For example, the computing device or other component that controls the operation of the machine press 130 may be configured with specific executable instructions that, when executed by the computing device or other component, cause the computing device or other component to perform the operations described herein with respect to the base station 120.

Example Block Diagram for Aggregating and Displaying Machine Press Data

Figure 8:
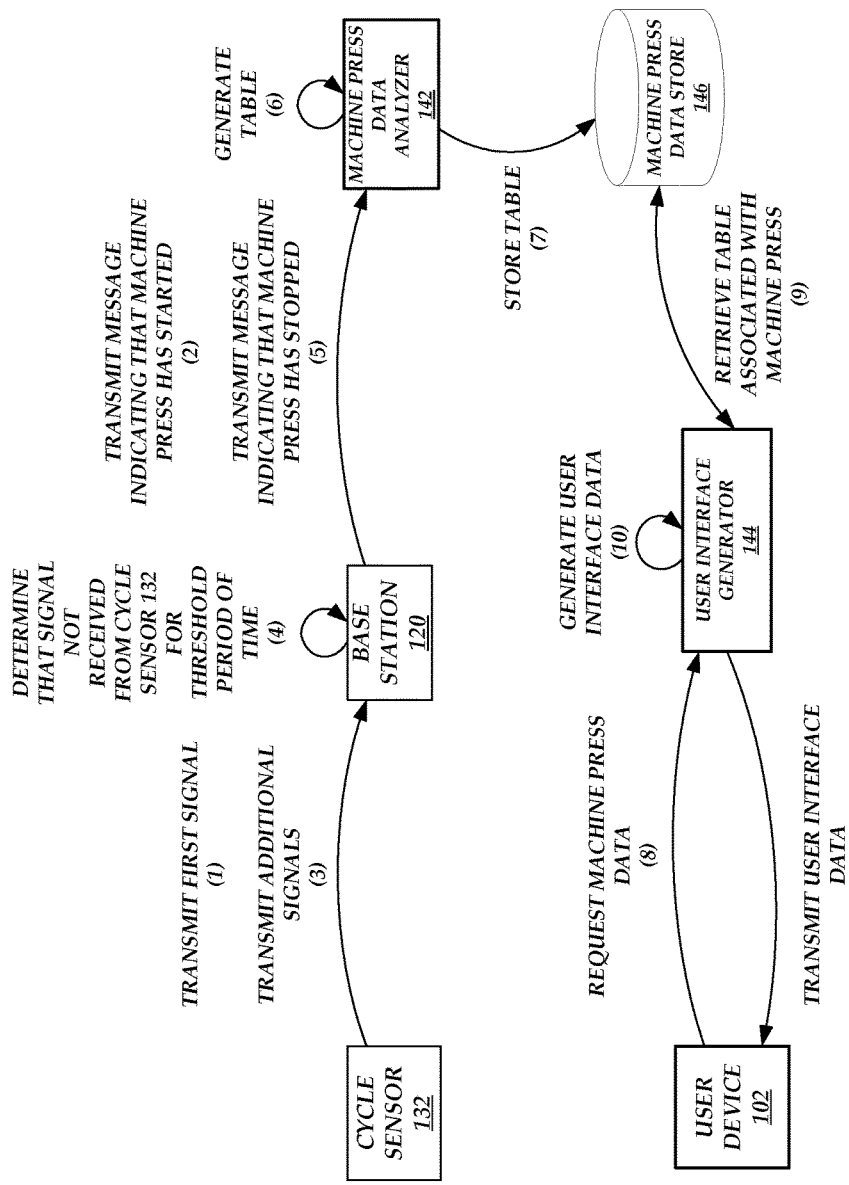
FIG. 8 is a block diagram of the machine press data monitoring and analysis environment of FIG. 1 illustrating the operations performed by the components of the machine press data monitoring and analysis environment to aggregate and display machine press data.

FIG. 8 is a block diagram of the machine press data monitoring and analysis environment 100 of FIG. 1 illustrating the operations performed by the components of the machine press data monitoring and analysis environment 100 to aggregate and display machine press 130 data. As illustrated in FIG. 8, the cycle sensor 132 transmits a first signal to the base station 120 at (1). The first signal may be the first signal transmitted by the cycle sensor 132 after the machine press 130 starts running. The first signal may be generated by the cycle sensor 132 based on the magnet 202 passing the magnet 302 in the same horizontal or vertical plane.

Upon receiving the first signal from the cycle sensor 132, the base station 120 may determine that the machine press 130 has started running. Thus, the base station 120 may transmit to the machine press data analyzer 142 a message indicating that the machine press 130 has started at (2). The message may include a timestamp or other time value indicating a time that the first signal was received from the cycle sensor 132 (e.g., which represents a time that the machine press 130 started running).

Each time the magnet 202 passes the magnet 302 during machine press 130 operation, the circuit 304 may generate a signal that is transmitted by the cycle sensor 132 to the base station 120 at (3). The base station 120 can keep track of the number of detected cycles as the additional signals are received.

After some time, the base station 120 may cease receiving signals from the cycle sensor 132. If the base station 120 determines that a signal has not been received from the cycle sensor 132 for at least a threshold period of time (e.g., 5 seconds, 10 seconds, etc.) at (4), then the base station 120 transmits a message to the machine press data analyzer 142 indicating that the machine press 130 has stopped at (5). The message indicating that the machine press 130 has stopped may include a timestamp or other time value indicating a time that the last signal was received from the cycle sensor 132 (e.g., which represents a time that the machine press 130 stopped running), the number of detected cycles, and/or additional information (e.g., an operator name, a job identification, comments or notes, etc.).

Using the data received in the message indicating that the machine press 130 has started and the data received in the message indicating that the machine press 130 has stopped, the machine press data analyzer 142 can generate a table corresponding to the machine press 130 that indicates the machine press 130 start time, the machine press 130 end time, distance, length, or amount of material processed during machine press 130 operation, and/or other information. For example, the machine press data analyzer 142 can convert the number of detected cycles into a distance value using a conversion factor associated with the machine press 130 and insert the distance value into the table. The machine press data analyzer 142 can store the table in the machine press data store 146 at (7).

During or after the machine press 130 stops operating, the user device 102 can request machine press data from the user interface generator 144 at (8). In response to the request, the user interface generator 144 can retrieve the table associated with the machine press 130 from the machine press data store 146 at (9) and can generate user interface data at (10) that, when rendered by the user device 102, causes the user device 102 to display the table in a GUI. The user interface generator 144 can then transmit the user interface data to the user device 102 at (11).

Example Machine Press Data Aggregation Routine

Figure 9:
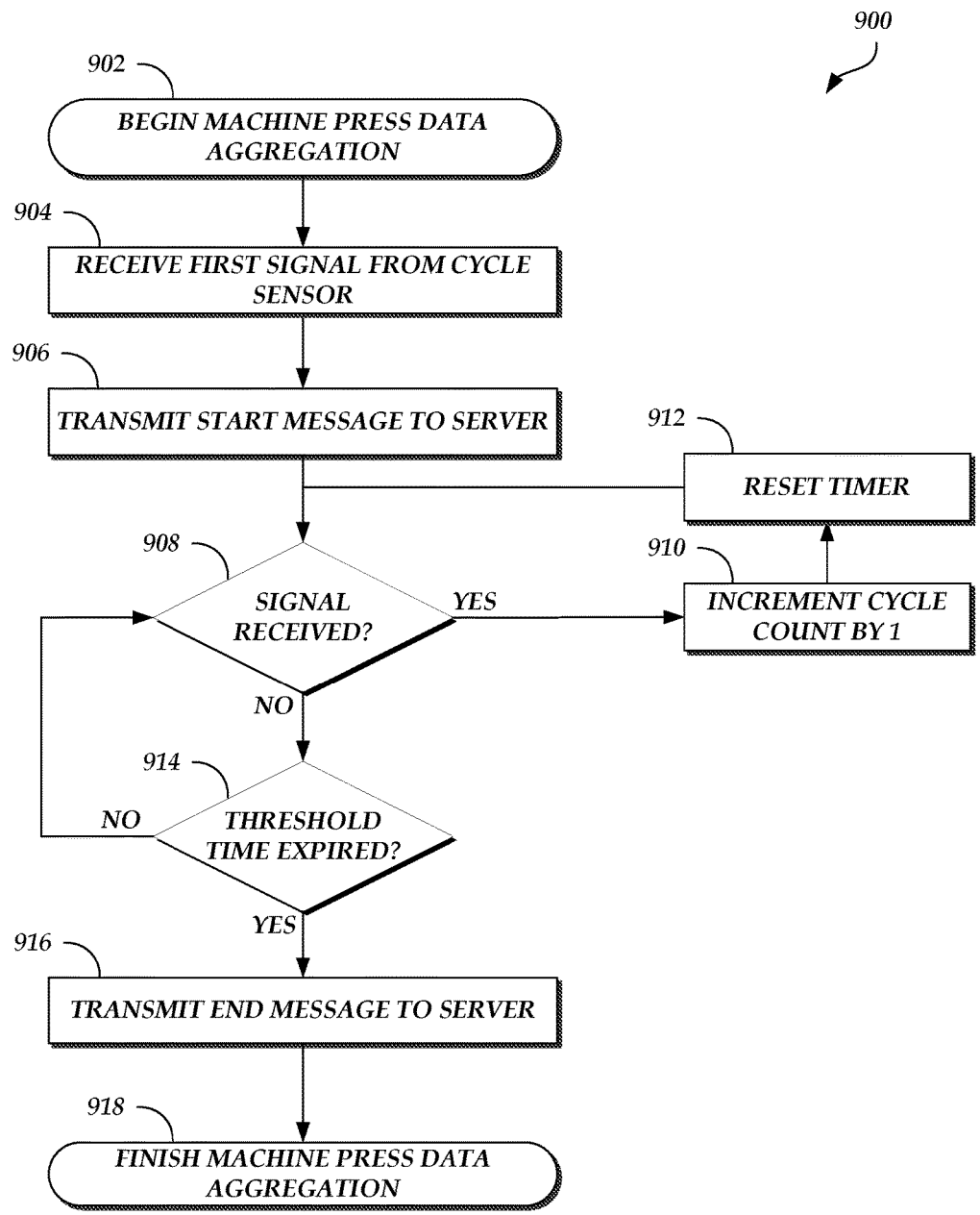
FIG. 9 is a flow diagram depicting a machine press data aggregation routine illustratively implemented by a base station, according to one embodiment.

FIG. 9 is a flow diagram depicting a machine press data aggregation routine 900 illustratively implemented by a base station, according to one embodiment. As an example, the base station 120 of FIG. 1 can be configured to execute the machine press data aggregation routine 900. The machine press data aggregation routine 900 begins at block 902.

At block 904, a first signal is received from the cycle sensor. The first signal may be the first signal received from the cycle sensor and therefore may indicate that the machine press 130 has started. The base station 120 may record the time that the first signal is received. The base station 120 may also set a counter used to track the number of detected cycles to one and start a timer used to determine when the machine press 130 has stopped running.

At block 906, a start message is transmitted to a server, such as the machine press data analysis server 140. The start message may include the recorded time that indicates when the machine press 130 started running.

At block 908, a determination is made as to whether another signal is received from the cycle sensor. If another signal is received from the cycle sensor, then the machine press data aggregation routine 900 proceeds to block 910. Otherwise, if another signal is not received from the cycle sensor, then the machine press data aggregation routine 900 proceeds to block 914.

At block 910, the counter used to track the number of detected cycles is incremented by 1. The counter may be incremented because the signal received from the cycle sensor 132 indicates that a component of the machine press 130 has completed a cycle.

At block 912, the timer is reset. The timer may be reset because, for example, another signal is received from the cycle sensor 132, which indicates that the machine press 130 is still operating. After resetting the timer, the machine press data aggregation routine 900 proceeds back to block 908.

At block 914, a determination is made as to whether a threshold time expired. For example, the threshold time (e.g., 5 seconds, 10 seconds, etc.) has expired if the timer reaches the threshold time before the timer is reset. If the threshold time has expired, then the machine press data aggregation routine 900 proceeds to block 916. Otherwise, if the threshold time has not expired, then the machine press data aggregation routine 900 proceeds back to block 908.

At block 916, an end message is transmitted to the server. For example, the end message is transmitted because the threshold time has expired, which may indicate that the machine press 130 has stopped running. The end message can include data monitored or collected and determined by the base station 120, including a machine press 130 start time, a machine press 130 end time, a number of detected cycles, and/or additional information. Such additional information can include a job identification, an operator name, and/or the like that are, for example, scanned in using a scanner coupled to the base station 120 while the machine press 130 is running (e.g., between receipt of the first signal and receipt of the last signal before the threshold time expires). After the end message is transmitted to the server, the machine press data aggregation routine 900 may be complete, as shown in block 918.

Example User Interfaces

Figure 10:
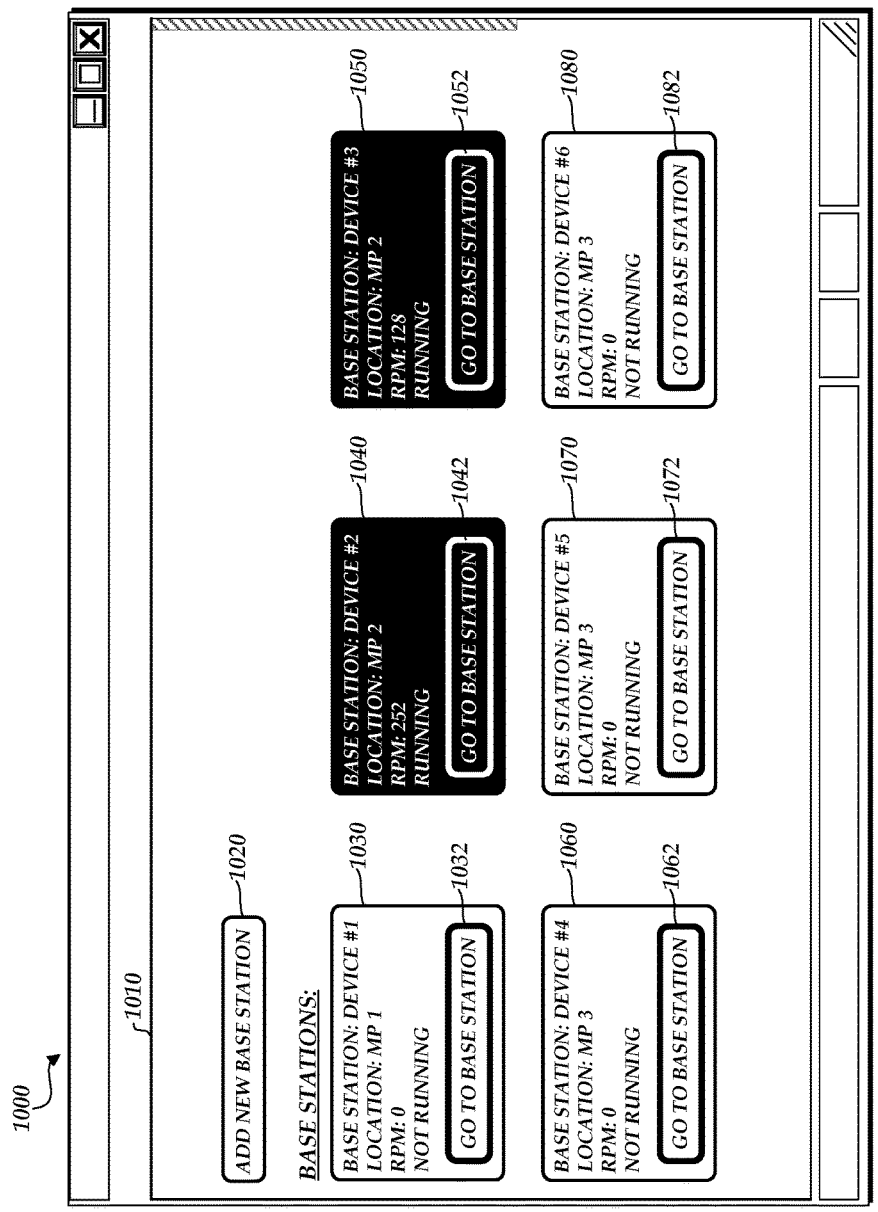
FIG. 10 illustrates an example user interface that may be displayed on a user device to show a status of multiple machine presses.

FIG. 10 illustrates an example user interface 1000 that may be displayed on a user device 102 to show the status of multiple machine presses 130. The user interface 1000 may be rendered and displayed on the user device 102 based on user interface data generated and provided by the user interface generator 144. As illustrated in FIG. 10, the user interface 1000 includes a window 1010 that shows information for various base stations 130. For example, the window 1010 includes a box 1030 that provides information for a base station 120 named "DEVICE #1," a box 1040 that provides information for a base station 120 named "DEVICE #2," a box 1050 that provides information for a base station 120 named "DEVICE #3," a box 1060 that provides information for a base station 120 named "DEVICE #4," a box 1070 that provides information for a base station 120 named "DEVICE #5," and a box 1080 that provides information for a base station 120 named "DEVICE #6." Information included in the boxes 1030, 1040, 1050, 1060, 1070, and 1080 include the name of the base station 130, the location of the base station 120 (e.g., machine press (MP) 1, MP 2, MP 3, a geographic location, a physical location within a building, etc.), the speed of the component of the machine press 130 associated with the respective base station 120 (e.g., in RPMs, MPHs, KPHs, etc.), and whether or not the machine press 130 associated with the respective base station 120 is running. Whether or not the machine press 130 associated with the respective base station 120 is running may be known based on the messages received from the respective base station 120. For example, if a start message is received without a corresponding end message, then the machine press 130 associated with the respective base station 120 is still running. Conversely, if a start message and an end message have been received, and no subsequent start message has been received, then the machine press 130 associated with the respective base station 120 is no longer running. As shown in FIG. 10, multiple base stations 120 may be located at (e.g., associated with) the same machine press 130 (e.g., DEVICE #2 and DEVICE #3 are both located at MP 2).

The window 1010 also includes several buttons. For example, button 1020, if selected, allows a user to add a new base station 120 from which machine press 130 data can be received. As another example, buttons 1032, 1042, 1052, 1062, 1072, and 1082, if selected, allow a user to view machine press 130 data collected by the respective base station 120 and associated with the respective machine press 130. For example, selection of the button 1042 allows a user to view machine press 130 data collected by DEVICE #2 and associated with MP 2.

FIG. 11 illustrates an example user interface 1100 that may be displayed on a user device 102 if the button 1062 is selected. The user interface 1100 may be rendered and displayed on the user device 102 based on user interface data generated and provided by the user interface generator 144. As shown in FIG. 10, button 1062 is associated with the base station 120 named DEVICE #4 and this particular base station 120 is configured to collect data from a machine press 130 that is not currently running. Thus, selection of the button 1062 causes the user interface 1100 to display information associated with DEVICE #4 and the corresponding machine press 130 named MP 3.

As illustrated in FIG. 11, the user interface 1100 includes a window 1110. The window 1110 includes a box 1160 that identifies the base station 120 name (e.g., DEVICE #4), the location of the base station 120 (e.g., MP 3), the speed of the component of the machine press 130 named MP 3 from which the base station 120 named DEVICE #4 collects data (or the speed of MP 3 itself) (e.g., in feet per minute), an identification of the device units (e.g., feet), an identification of the conversion factor (e.g., 0.3802), whether or not MP 3 is running, and a button 1162 that, if selected, allows a user to return to the user interface 1000.

The window 1110 further includes a box 1120 that can display base station 120 options and/or allow a user to update the base station 120 options or information (e.g., via the selection of button 1122). For example, the base station 120 options that can be displayed and/or updated may include the conversion factor (e.g., the unit conversion).

The window 1110 further includes a table 1130 generated by the machine press data analyzer 142 that displays the day, the date, a total distance value (e.g., representing the length or amount of material processed by the component of the MP 3 or the MP 3 itself, in feet), and total uptime of the component of the MP 3 associated with DEVICE #4 (or total uptime of MP 3 itself) during the current day. The total distance value may be calculated by the machine press data analyzer 142 using the conversion factor and the number of detected cycles included in each of the end messages received during the current day. For example, the machine press data analyzer 142 can, for each end message received during the current day, multiple the conversion factor by the number of detected cycles included in the respective end message to determine a distance. The machine press data analyzer 142 can then sum the determined distances to determine the total distance value for the current day.

The total uptime may represent a total amount of time that the component of the MP 3 associated with DEVICE #4 or the MP 3 itself is running during the current day. The total uptime may be calculated by the machine press data analyzer 142 based on pairs of start and end messages received from DEVICE #4 during the current day. For example, the machine press data analyzer 142 can, for each pair of start and end messages received during the current day, subtract the time value included in the respective start message from the time value included in the respective end message to determine a time that the MP 3 was running. The machine press data analyzer 142 can then sum each of the determined times to determine the total uptime for the current day.

The machine press data analyzer 142 can store the total distance value and the total uptime in the table 1130 and store the table 1130 in the machine press data store 146. To view detailed information on when the MP 3 started and stopped during the current day (e.g., as shown in table 1230 described below), the user can select button 1132.

The window 1110 may also include a table 1140 generated by the machine press data analyzer 142 that displays daily reports corresponding to data collected from DEVICE #4. For example, each daily report (e.g., each row) may include one or more job identifications, the day, the date, a total distance value (e.g., in feet), a total uptime, and a manned percentage. The manned percentage may represent a percent of the time that the component of the MP 3 or the MP 3 itself was running while the MP 3 was manned by an operator. The machine press data analyzer 142 can store the table 1140 in the machine press data store 146.

FIG. 12 illustrates an example user interface 1200 that may be displayed on a user device 102 if the button 1042 is selected. The user interface 1200 may be rendered and displayed on the user device 102 based on user interface data generated and provided by the user interface generator 144. As shown in FIG. 10, button 1042 is associated with the base station 120 named DEVICE #2 and this particular base station 120 is configured to collect data from a machine press 130 that is currently running. Thus, selection of the button 1042 causes the user interface 1200 to display information associated with DEVICE #2 and the corresponding machine press 130 named MP 2.

As illustrated in FIG. 12, the user interface 1200 includes a window 1210. The window 1210 includes a box 1240 that identifies the base station 120 name (e.g., DEVICE #2), the location of the base station 120 (e.g., MP 2), the speed of the component of the machine press 130 named MP 2 from which the base station 120 named DEVICE #2 collects data (or the speed of MP 2 itself) (e.g., in feet per minute), an identification of the device units (e.g., feet), an identification of the conversion factor (e.g., 0.3802), whether or not MP 2 is running, and a button 1242 that, if selected, allows a user to return to the user interface 1000.

The window 1210 further includes a box 1220 that can display information associated with the manned percentage.

For example, the box 1220 can display the current manned percentage (e.g., for the current day), the total runtime for a period (e.g., the uptime for a period, such as the current day), the total manned hours for the period, fields for entering the total manned hours for the period, and a button 1222 that, when selected, causes the machine press data analyzer 142 to calculate the manned percentage based on the entered total manned hours for the period and the total runtime for the period (e.g., the machine press data analyzer 142 divides the total manned hours for the period by the total runtime for the period and multiplies by 100).

The window 1210 further includes a table 1230 generated by the machine press data analyzer 142 that displays, for a current period (e.g., the current day), a job identification, a start time, an end time, a total distance value (e.g., representing the length or amount of material processed by the component of the MP 2 or the MP 2 itself, in feet), an operator, a mark, a runtime (e.g., the amount of time elapsed between the start time and the end time), and any comments or notes. As shown in the first row of the table 1230, an entry for the start time is provided. No entry for the end time is provided because the MP 2 is currently running and no end message has been received from DEVICE #2 yet.

As described herein, the machine press data analyzer 142 can process any of the data included in the tables 1130, 1140, and/or 1230 and/or any of the data received in the start and end messages to generate information useful for analyzing the efficiency of machine presses 130 and/or operators. For example, the machine press data analyzer 142 can compare data associated with one machine press 130 with data associated with other machine presses 130 to identify patterns, problems, machine press 130 efficiency, operator efficiency, and/or the like. In particular, the manned percentage can be processed by the machine press data analyzer 142 to determine operator efficiency. Similarly, notes or comments (e.g., such as notes indicating jams or other malfunctions) in concert with the manned percentage, total runtime or uptime, and/or the like can be processed by the machine press data analyzer 142 to identify machine presses 130 that are failing mechanically, operating inefficiently, and/or the like.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a cycle sensor comprising a first magnet, the cycle sensor configured to be coupled to a machine press, wherein the cycle sensor is configured to detect a cycle of the machine press; and
   a base station comprising at least one processor, wherein the base station is configured with computer-executable instructions that, when executed by the at least one processor, cause the base station to at least:
     process a first signal received from the cycle sensor;
     transmit a start message to a server over a network and start a timer in response to reception of the first signal, wherein the start message indicates that the machine press has started running;
     process a second signal received from the cycle sensor after the first signal;
     reset the timer in response to reception of the second signal;
     determine that no signal has been received from the cycle sensor during a threshold period of time after reception of the second signal in response to expiration of the timer; and
     transmit an end message to the server over the network in response to the determination that no signal has been received from the cycle sensor during the threshold period of time after the reception of the second signal, wherein the end message indicates that the machine press has stopped running.

2. The system of claim 1, wherein the cycle sensor comprises a circuit configured to be coupled to a fixed surface of the machine press, the first magnet configured to be coupled to the circuit, and a second magnet configured to be coupled to a component of the machine press that moves in a repetitive pattern.

3. The system of claim 1, wherein a movement of the second magnet passed the first magnet causes the circuit to generate the first signal and transmit the first signal to the base station.

4. The system of claim 3, wherein generation of the first signal represents a detection of one cycle of the machine press.

5. The system of claim 1, wherein the component of the machine press comprises at least one of a component that rotates about an axis, a component that moves back and forth in a horizontal direction, or a component that moves back and forth in a vertical direction.

6. The system of claim 1, wherein the first magnet and the second magnet are configured to be positioned within the machine press such that the second magnet passes the first magnet in a same horizontal or vertical plane during completion of one cycle of the machine press.

7. The system of claim 1, wherein the start message comprises a time value corresponding to a time that the first signal is received by the base station.

8. The system of claim 1, wherein the end message comprises a time value corresponding to a time that the second signal is received by the base station and a number of detected cycles.

9. The system of claim 8, wherein the number of detected cycles is based on a number of signals received by the base station from the cycle sensor.

10. The system of claim 8, wherein the server is configured to determine an amount of material processed by the machine press based on the number of detected cycles and a conversion factor associated with the machine press.

11. The system of claim 1, wherein the base station comprises a terminal block with a plurality of output ports, and wherein the system further comprises an external device coupled to the plurality of output ports.

12. The system of claim 11, wherein the base station is further configured with computer-executable instructions that, when executed, cause the base station to at least:
output a first voltage on a first output port in the plurality of output ports and on a second output port in the plurality of output ports after the first signal is received and before the second signal is received to cause the external device to output a first color; and
output the first voltage on the first output port and a second voltage on the second output port after the threshold period of time after reception of the second signal has elapsed to cause the external device to output a second color different from the first color.

13. A computer-implemented method, the method comprising:
as implemented by one or more computing devices configured with specific computer-executable instructions,
receiving a first signal from a cycle sensor, wherein the cycle sensor is coupled to a machine press and is configured to detect a cycle of the machine press;
transmitting a start message to a server over a network and start a timer in response to reception of the first signal, wherein the start message indicates that the machine press has started running;
receiving a second signal from the cycle sensor after the first signal;
resetting the timer in response to reception of the second signal;
determining that no signal has been received from the cycle sensor during a threshold period of time after reception of the second signal in response to expiration of the timer; and
transmitting an end message to the server over the network in response to the determination that no signal has been received from the cycle sensor during the threshold period of time after the reception of the second signal, wherein the end message indicates that the machine press has stopped running.

14. The computer-implemented method of claim 13, wherein the cycle sensor comprises a circuit coupled to a fixed surface of the machine press, a first magnet coupled to the circuit, and a second magnet coupled to a component of the machine press that moves in a repetitive pattern.

15. The computer-implemented method of claim 14, wherein a movement of the second magnet passed the first magnet causes the circuit to generate and transmit the first signal.

16. The computer-implemented method of claim 14, wherein the first magnet and the second magnet are positioned within the machine press such that the second magnet passes the first magnet in a same horizontal or vertical plane during completion of one cycle of the machine press.

17. The computer-implemented method of claim 13, wherein the one or more computing devices comprises a terminal block with a plurality of output ports, and wherein an external device is coupled to the plurality of output ports.

18. The computer-implemented method of claim 17, further comprising:
outputting a first voltage on a first output port in the plurality of output ports and on a second output port in the plurality of output ports after the first signal is received and before the second signal is received to cause the external device to output a first color; and
outputting the first voltage on the first output port and a second voltage on the second output port after the threshold period of time after reception of the second signal has elapsed to cause the external device to output a second color different from the first color.

19. Non-transitory, computer-readable storage media comprising computer-executable instructions stored thereon that, when executed by a computer system, cause the computer system to:
process a first signal received from a cycle sensor, wherein the cycle sensor is coupled to a machine press and is configured to detect a cycle of the machine press;
transmit a start message to a server over a network and start a timer in response to reception of the first signal, wherein the start message indicates that the machine press has started running;
process a second signal received from the cycle sensor after the first signal;
reset the timer in response to reception of the second signal;
determine that no signal has been received from the cycle sensor during a threshold period of time after reception of the second signal in response to expiration of the timer; and
transmit an end message to the server over the network in response to the determination that no signal has been received from the cycle sensor during the threshold period of time after the reception of the second signal, wherein the end message indicates that the machine press has stopped running.

20. The non-transitory, computer-readable storage media of claim 19, wherein the cycle sensor comprises a circuit coupled to a fixed surface of the machine press, a first magnet coupled to the circuit, and a second magnet coupled to a component of the machine press that moves in a repetitive pattern.

* * * * *